United States Patent [19]

Niskin

[11] 4,106,751
[45] Aug. 15, 1978

[54] ROTATABLE VALVE ASSEMBLY

[76] Inventor: Shale J. Niskin, 2941 Lucaya, Miami, Fla. 33133

[21] Appl. No.: 824,784

[22] Filed: Aug. 15, 1977

Related U.S. Application Data

[63] Continuation-in-part of Ser. No. 788,588, Apr. 18, 1977, Pat. No. 4,091,676, which is a continuation-in-part of Ser. No. 691,905, Jun. 1, 1976, Pat. No. 4,037,477.

[51] Int. Cl.² .............................................. F16K 5/00
[52] U.S. Cl. .................................. 251/316; 251/172; 251/174
[58] Field of Search ....................... 251/172, 174, 316

[56] References Cited
U.S. PATENT DOCUMENTS

| 1,584,600 | 5/1926 | Black | 251/174 |
| 3,281,112 | 10/1966 | Walker | 251/174 |
| 3,323,542 | 6/1967 | Magos | 251/172 X |
| 3,401,914 | 9/1968 | Shand | 251/172 |
| 3,533,597 | 10/1970 | Bolling | 251/174 |
| 3,752,178 | 8/1973 | Grove | 251/174 X |
| 4,020,864 | 5/1977 | Church | 251/172 X |

Primary Examiner—Harold W. Weakley
Attorney, Agent, or Firm—Salvatore G. Militana

[57] ABSTRACT

A rotatable valve assembly for controlling the flow of fluids under pressure having a ball valve, a valve seat engaging the valve on opposite sides thereof, one of the valve seats being fixed and the other being movable; with fluid tight seals mounted on the valve seats and engaging the ball valve, the movable valve seat being responsive to the fluid under pressure whereby variation of fluid pressures will compel the movement of the ball valve toward and away from the fixed valve seat to provide a fluid tight seal therealong.

4 Claims, 6 Drawing Figures

ROTATABLE VALVE ASSEMBLY

CROSS REFERENCES TO A RELATED PATENT APPLICATION

This application is a continuation in part of my copending application, Ser. No. 788,588, filed on Apr. 18, 1977, for WATER SAMPLE COLLECTING DEVICE now U.S. Pat. No. 4,091,676 which in turn is a continuation in part of my copending application Ser. No. 691,905, filed on June 1, 1976, for WATER SAMPLER DEVICE and issued as U.S. Pat. No. 4,037,477, on July 26, 1977.

BACKGROUND OF THE INVENTION

1. Field of the Invention

This invention relates to rotatable valve structures but is more particularly directed to a floating valve assembly for ball valves responsive to variations in pressures of fluids being controlled by the valve assembly.

2. Description of the Prior Art

All rotatable valve assemblies utilizing ball or spherical surfaced valves consist of a pair of valve seats engaging the valve on opposite sides thereof with seals interposed between the valve and valve seats. The amount of pressure or force being imposed at the seals by the valve seats against the ball valve determines the effectiveness of the seal against leakage. However, the greater this pressure is, the more difficult it will be to actuate or rotate the valve from one position to the other.

The conventional rotatable valve devices provide valve seats that are fixed in relation to the ball valve. Consequently, in order to prevent the possibility of leakage of fluids past rotatable valves when in a closed position, the valve seats are secured tightly against the valve. In so doing, the ball valve becomes difficult to rotate to its various positions especially if the valve is manually actuated. Therefore, it is important that the valve seats be tightened against the valve only to the degree that the seals therebetween prevent any leakage when the valve is in a closed position. In addition if there is an increase in fluid pressure after the valve seats had been adjusted for a lesser pressure, a leakage would possibly occur. Other conditions that may cause rotatable valves to leak occur after a considerable passage of time or use of the valve when the seals become worn, misshapen or lose their resiliency so that the valve seats are no longer sufficiently tightened against the valve to render the seals effective to prevent leakage therealong. By the use of a floating valve seat, the present invention contemplates avoiding the above objections to the conventional fixed valve seals for ball valves.

SUMMARY OF THE INVENTION

Therefore, a principal object of the present invention is to provide a rotatable valve assembly for fluids under pressure having a ball valve secured in position by a fixed valve seat on one side and a floating valve seat on the other side which is responsive to the fluid under pressure.

Another object of the present invention is to provide a rotatable valve assembly for fluids under pressure having a ball valve secured in position by valve seats engaging the ball valve with a force that varies with variation of the fluids under pressure whereby the force exerted by the valve seats is no greater than that required to render the valve leaktight.

A further object of the present invention is to provide a rotatable valve assembly having a ball valve secured in position by valve seats on either side thereof with seals interposed between the ball valve and the seats whereby the seals remain effective after passage of considerable time and use.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the drawings:

FIG. 4 is an exploded view of either end of the water sampler showing the valve assembly.

DESCRIPTION OF THE PREFERRED EMBODIMENTS

Figure 1:
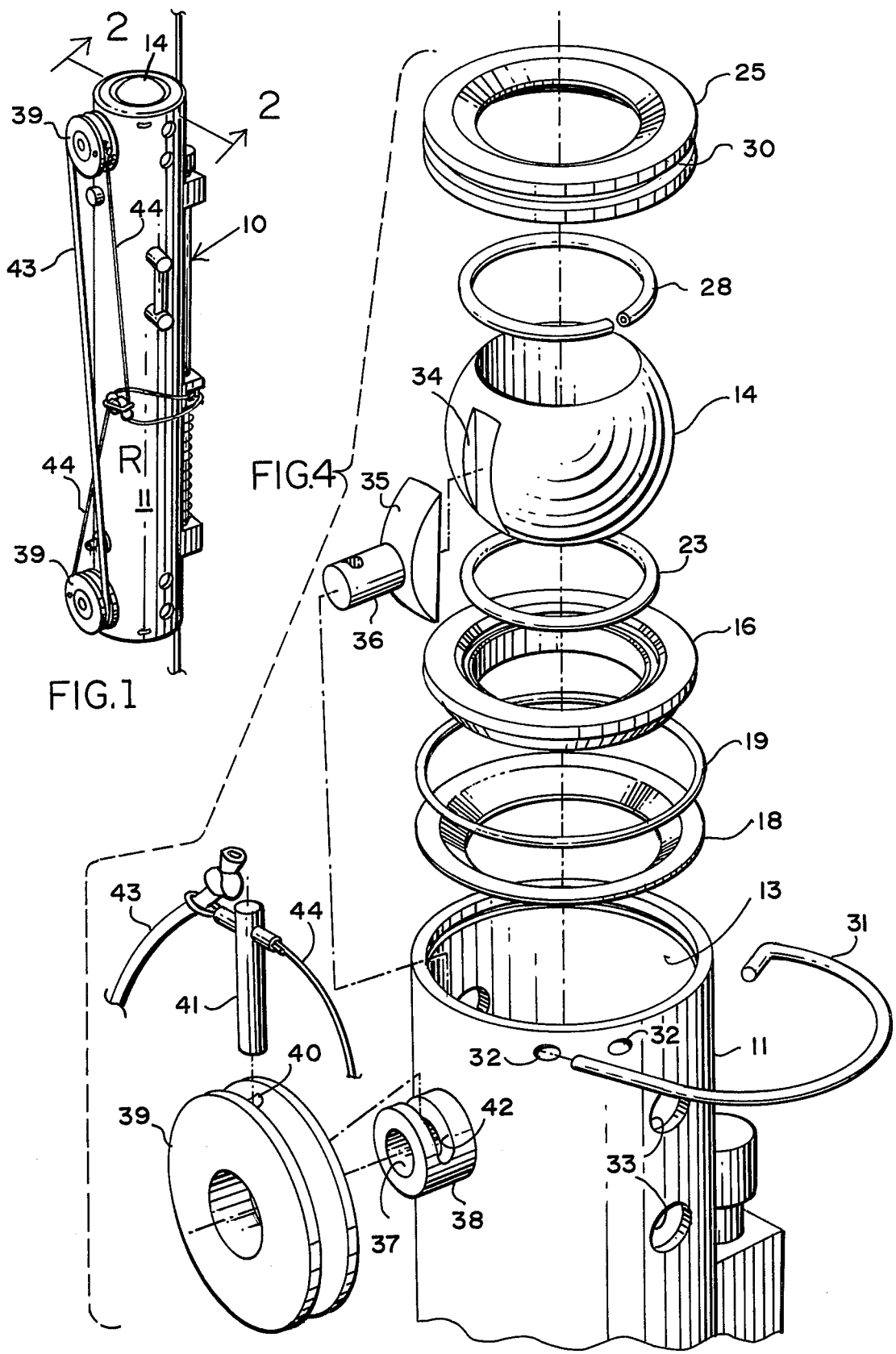
FIG. 1 is a perspective view of a water sampler having a rotatable valve assembly constructed in accordance with my invention.

Referring to the drawings wherein like numerals are used to designate similar parts throughout the several views the numeral 10 refers to my water sampler consisting of a tubular member 11 at each end of which there is a chamber 13 mounting a spherical or ball valve assembly A, the subject matter of the present application.

Figure 2:
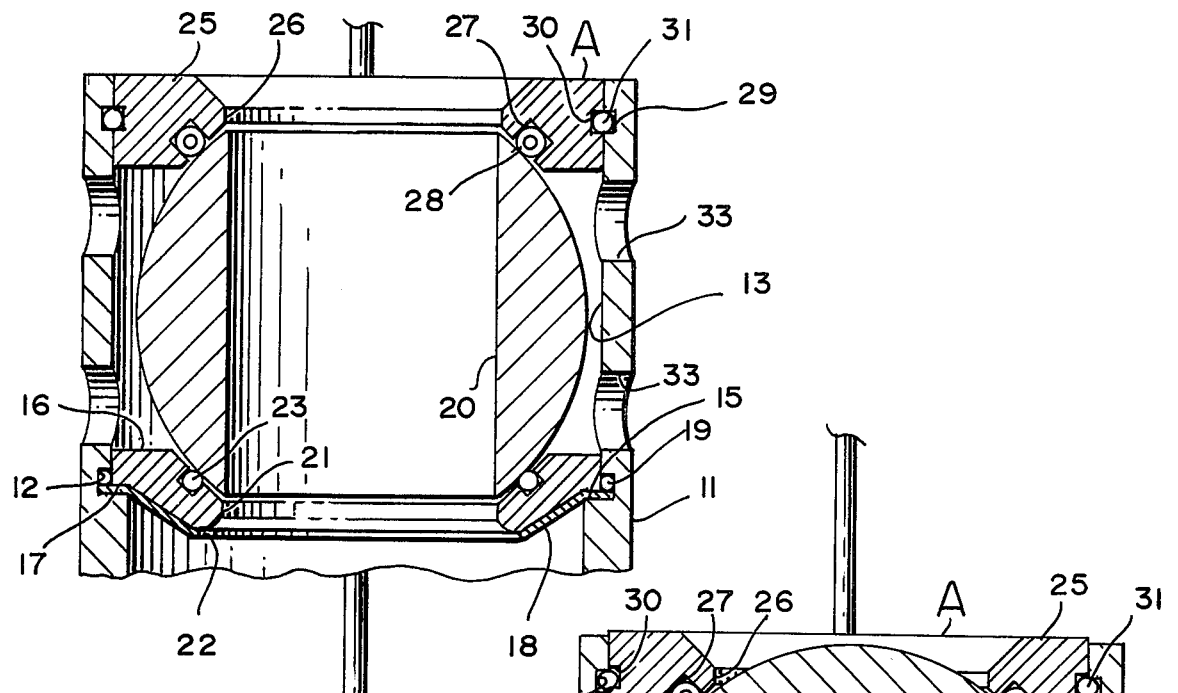
FIG. 2 is a fragmentary longitudinal cross sectional view taken along the line 2—2 of FIG. 1 showing the ball valve in an open position.

Each of the ball valve assemblies A is identical in construction and operation so that a detailed description of either ball valve assembly applies to the other. Within the valve chambers 13 are identical ball or spherical valves 14 rotatably mounted therein. Each of the valve chambers 13 is provided with a peripheral groove 12 forming a ledge or shoulder 15 by reason of the wall thickness of the tubular member 11 being thinner at the valve chamber 13 than that portion of the tubular member 11 extending between the valve chambers 13. The ledge 15 supports a floating valve seat 16 at its periphery 17 with a flexible diaphragm 18 interposed between the shoulder 17 and the ledge 15. The flexible diaphragm 18 is locked in position in the slot 12 by means of an O-ring 19 positioned in the peripheral slot 12 and wedged between the periphery of the flexible diaphragm 18 and the upper surface 120 of the slot 12. The O-ring 19 also acts as a seal to prevent the leakage of fluid at the periphery of the valve seat 16. The ball valve 14 is provided with an axially disposed opening 20 forming a fluid passageway while the valve seat 16 and flexible diaphragm 18 have openings 21 and 22 respectively in alignment with the opening 20 whereby fluid may flow into and out of the sampler 10 when the valve 14 is in an open position, as shown by FIG. 2. The ball valve 14 engages an O-ring 23 mounted on a slot 24 formed on the valve seat 16 to form a seal between the ball valve 14 and the valve seat 16 and thereby prevent the leakage of fluid therealong when the valve 14 is in a closed position.

A fixed ring-shaped valve seat 25 is mounted at each of the free ends of the tubular member 11 engaging the ball valves 14 to maintain the ball valves 14 in a firm but rotatable condition within the chambers 13. The outer valve seats 25 are each provided with a centrally disposed opening 26 and an inner peripheral groove 27 adjacent the opening 26 for receiving a hollow O-ring 28 that engages the ball valve 14, for sealing same. The outer valve seat 25 are non-movable being secured to the bottle 11 by peripheral matching grooves 29 and 30 formed on the inner surface of the bottle 11 and outer surface of the outer valve seat 22 respectively with a pliable locking rod 31 received therein, as shown and described in detail in my U.S. Pat. No. 3,986,635, for Closure Locking And Orienting Device. Bores 32 formed in the wall of the bottle 11 in alignment with the grooves 29 and 30 permit the threading of the pliable rod 31 into position in the matching grooves 29 and 30 to secure the valve seat 25 against movement. Openings 3 formed in the side walls of the bottle 11 prevent water from being trapped in the valve chamber 13 when the valves 14 are in an open position.

The ball valve 14 is provided with a slot 34 on its outer surface for receiving a plug 35 mounted on the end of a stub shaft 36. The latter extends through an opening in the tubular member 11, in alignment with a bore 35 in a collar 38 mounted on the tubular member 11. A pulley 39 is rotatably mounted on the stub shaft 38 and provided with a radially disposed bore 40 for receiving a pin 41 which extends into an 180° peripheral groove 42 formed on the periphery of the collar 38. The pin 41 is secured to an elongated elastic member 43 on one side and a lanyard 44 on the other side thereof. The elastic member 43 extends between the pulleys 39 as shown by FIG. 1 while the lanyards 44 extend to a release device R whose function is explained in detail in my aforesaid copending application and form no part of this invention.

Figure 3:
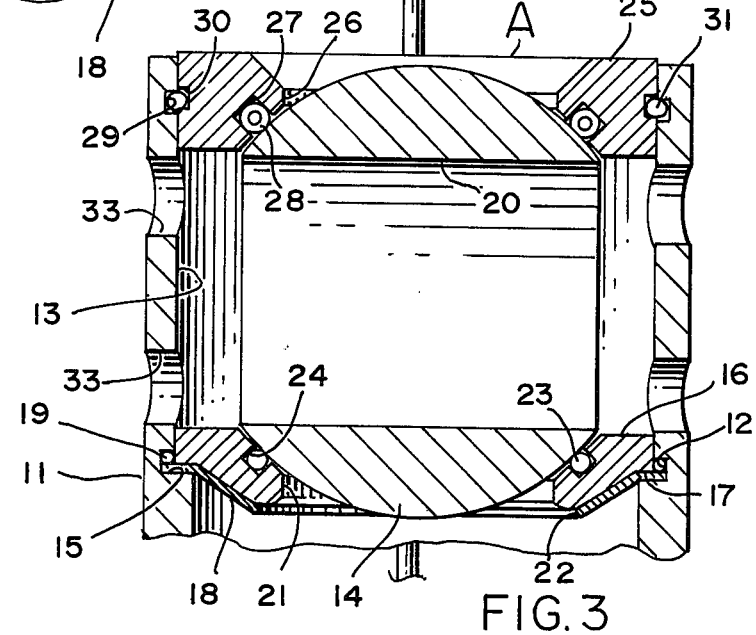
FIG. 3 is a similar view with the ball valve rotated to its closed position.

In the normal use of my water sampler bottle 10 after the container 11 has reached the depth in a body of water at which a sample of water is to be contained within the container 10, the valves 14 are rotated to their closed positions as shown by FIG. 3 and described in detail in my copending application. The O-ring 19 forms a fluid tight juncture between the floating valve seat 16 and the inner surface of the tubular member 11 as well as securing the flexible diaphragm 18 against its outer periphery from slipping out of the groove 17. The O-rings 23 and 28 prevent any leakage of fluid between the ball valve 14 and valve seats 16 and 25. As the water sampler 10 filled with the desired sample of water is brought up to the surface of the body of water, the pressure of water within the bottle 11 will be greater than that in the surrounding body of water. Consequently, the flexible diaphragm 18 and the seat 16 will slide in the direction of the fixed valve seat 25 causing the O-ring 23 to bear more tightly against the ball valve 14 which in turn causes the hollow O-ring 28 to become more tightly compressed against the ball valve 14 so that the probability of leakages at the O-rings 23 and 28 is greatly reduced and the valve seats 16 and 25 are tightened against the ball valve 14 at no greater pressure than that required by the increased pressure of fluid within the container 11 since the floating valve seat 16 moves in response to the fluid pressure within the container 11. On the other hand, if the floating valve seat were fixed and not floating as described herein, it is obvious leakages along the seals 23 and 28 may occur upon the increase of fluid pressure thereon. To avoid possibility of leakage in this instance of increase fluid pressure, the valve seats 16 and 25 would have to be tightened against ball valve 14 in the conventional ball valve devices at a maximum pressure that would insure no leakage at the time the pressures within and without the bottle 10 are at their highest differential. Operation of the ball valve 14 now becomes difficult. In fact, if the ball valve is too tightly held between the fixed valve seats, the valve may become stuck and not be capable of rotating to its closed position.

The floating valve 16 permits the ready and easy actuation of the valve 14 when there is no necessity for the seals 23 and 27 to be tightly compressed against the ball valve 14 until there is a higher pressure of water within the bottle 11 than outside of the bottle. Then after the valve 14 is actuated to its closed position, in response to the higher internal fluid pressure the floating valve seat 14 will then slide outwardly against the ball valve 14 to more tightly compress the seals 23 and 28 against the valve seats 16 and 25 and render them more effectively leakproof.

In my copending application wherein a floating valve seat is provided, the O-ring is positioned between the floating valve seat and the tubular member. It has been found that after a passage of time, this O-ring which must be capable of rolling as the floating valve seat moves toward and away from the ball valve, loses its ability to roll as it either becomes fused to the container or loses its flexibility, and thereby becomes non-circular in cross section. The comparable O-ring 19 of the present invention remains secured in the slot 12 at all times to seal against leakage as well as secure the preiphery of the flexible diaphragm 18 in the slot 12 to permit the flexible diaphragm 18 to move with the floating valve seat 16.

Figure 5:
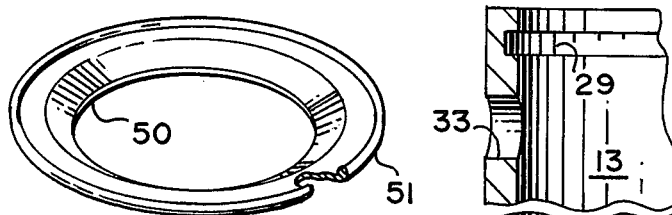
FIG. 5 is a perspective view of an alternate construction of the flexible diaphragm.
Figure 6:
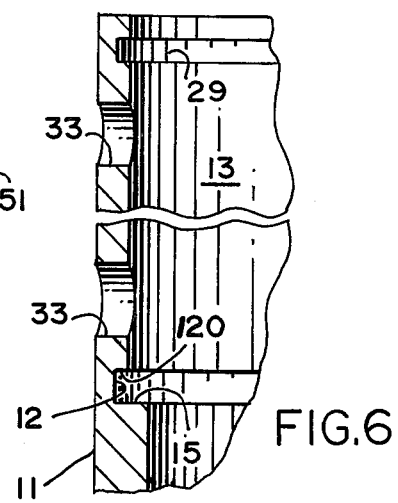
FIG. 6 is a fragmentary view of the tubular housing.

In the alternate construction of my flexible diaphragm 50 shown in FIG. 5, the flexible diaphragm 50 is provided with an O-ring 51 at its periphery molded as a single unit, otherwise the latter is identical in construction and function as the previously described flexible diaphragm 18 and O-ring 19.

What I claim as new and desire to secure by Letters Patent is:

1. A rotatable valve assembly comprising a tubular member having a valve chamber, a ball valve having a axially disposed passageway mounted in said chamber for controlling the flow of fluid therethrough, a ledge portion mounted about said tubular member at said valve chamber, said tubular member having a peripheral groove at said ledge portion, a floating valve seat positioned in proximity of said ball valve, said valve seat being slidably mounted in said valve chamber and having a peripheral shoulder member adapted to rest on said ledge portion, a flexible diaphragm engaging said floating valve seat and having an outer edge portion interposed between said ledge portion and said peripheral shoulder, a seal mounted in said groove and securing said outer edge portion of said flexible diaphragm in said peripheral groove, a fixed valve seat mounted in said valve chamber and engaging said ball valve on a side opposite that of said floating valve seat, both of said valve seats having seals engaging said ball valve with said flexible diaphragm and said valve seats having openings in alignment with said passageway in said ball valve.

2. The structure as recited by claim 1, wherein all of said seals being O-rings.

3. The structure as recited by claim 2 wherein both of said valve seats having peripheral grooves and said O-rings being mounted on said grooves and engaging said ball valve for preventing the flow of fluid therealong.

4. The structure as recited by claim 3 wherein said O-ring mounted on said fixed valve seat being hollow to permit the movement of said ball valve.

* * * * *